US007178651B2

(12) United States Patent
Leon

(10) Patent No.: US 7,178,651 B2
(45) Date of Patent: Feb. 20, 2007

(54) FAST REACTING THERMAL CLUTCH

(75) Inventor: Robert L. Leon, Maple Glen, PA (US)

(73) Assignee: Life-Pack Technologies, Inc., Maple Glen, PA (US)

( * ) Notice: Subject to any disclaimer, the term of this patent is extended or adjusted under 35 U.S.C. 154(b) by 149 days.

(21) Appl. No.: 11/089,074

(22) Filed: Mar. 24, 2005

(65) Prior Publication Data
US 2005/0241906 A1 Nov. 3, 2005

Related U.S. Application Data

(60) Provisional application No. 60/566,058, filed on Apr. 28, 2004.

(51) Int. Cl.
*F16D 43/25* (2006.01)
(52) U.S. Cl. ...................................... 192/82 T; 464/31
(58) Field of Classification Search .............. 192/82 T; 464/31
See application file for complete search history.

(56) References Cited

U.S. PATENT DOCUMENTS 3,477,554 A * 11/1969 Schiffer ..................... 192/81 R
4,561,529 A * 12/1985 McIntosh ................. 192/56.31
6,962,235 B2 * 11/2005 Leon ............................ 182/73

* cited by examiner

Primary Examiner—Richard M. Lorence
(74) Attorney, Agent, or Firm—Akin Gump Strauss Hauer & Feld, LLP

(57) ABSTRACT

A thermal clutch assembly is comprised of a radially inner rotatable member, a radially outer rotatable member a pair of axially spaced apart ring structures, and a thin tension web. The ring structures are both affixed to and rotate with one of the rotatable members and each has at least one substantially axial surface which may contact substantially axial surfaces of the other rotatable member. The tension web has high tensile strength, a high surface area to volume ratio, a thermally efficient flow arrangement to the surrounding medium, and high thermal conductivity. The tension web is secured to each of the two ring structures and substantially spans the space between the substantially axial surfaces of the ring structures, the web having a significantly higher thermal coefficient of expansion than the material between the substantially axial surfaces of the other rotatable member. In this manner, the web is in tension at temperatures of the surrounding medium below a predetermined temperature thereby causing the substantially axial surfaces of the ring structures to engage the substantially axial surfaces of the other rotatable member for coupling the two rotatable members for rotating together, and is not in tension at temperatures of the surrounding medium at or above the predetermined temperature thereby causing the substantially axial surfaces of the ring structures to disengage from the substantially axial surfaces of the other rotating structure for de-coupling the two rotatable members so they do not rotate together.

8 Claims, 2 Drawing Sheets

FAST REACTING THERMAL CLUTCH

CROSS-REFERENCE TO RELATED APPLICATIONS

This application claims priority from U.S. Provisional Patent Application No. 60/566,058 filed Apr. 28, 2004, the subject matter of which is hereby incorporated herein by reference.

BACKGROUND OF THE INVENTION

The present invention relates to thermal clutches and more particularly to an improved thermal clutch with a very short time constant.

It takes time for an object suddenly immersed in a new thermal environment to reach the temperature of the new environment. The process is quantified by a measure called the thermal time constant. The thermal time constant equals the time it takes for the object to reach 63.2 per cent of the difference between the old temperature and the new temperature. For a very thin (1/32nd of an inch diameter) piece of high conductivity copper wire, suddenly immersed in still air at a different temperature, the thermal time constant is a surprisingly long-one minute (60 seconds).

However, there is a need for a thermal clutch (an object much more massive than the thin piece of copper wire) with a thermal time constant of less than a second. A fast-reacting thermal clutch would improve an automatic controlled-descent device (U.S. patent application Ser. No. 10/757,956—Apparatus for Exterior Evacuation from Buildings) used for escaping from the upper floors of a burning building. The thermal clutch's function would be to rapidly de-couple the device's descent-slowing mechanism when the temperature of the surrounding medium goes to or above a predetermined temperature such as 200° F., and then to rapidly re-couple the decent slowing mechanism again when the temperature of the surrounding medium goes below 200° F. The thermal clutch requires a low (<1 second) thermal time constant in order to cause the person wearing the descent device to quickly accelerate (indeed, free-fall) through an intense hot zone resulting from a lower fire floor in less than a second, and then to quickly decelerate on the other side of the intense hot zone. By passing through the 200+° F. temperatures so fast, the person avoids getting burned—much as a circus tiger avoids getting burned when rapidly leaping through a flaming hoop, and one avoids being burned if one passes his finger through a 1,450° F. flame in a quarter of a second. Air temperatures below 200° F. can be endured for longer periods, as confirmed by the many people who spend time at those temperatures in saunas every day.

BRIEF SUMMARY OF THE INVENTION

Briefly stated, the present invention comprises a thermal clutch assembly for rapidly de-coupling one rotatable member from another rotatable member when the temperature of the surrounding medium goes to or above a predetermined temperature and for rapidly re-coupling the two rotatable members when the temperature of the surrounding medium returns to below the predetermined temperature. The assembly comprises a radially inner rotatable member, a radially outer rotatable member, a pair of axially spaced apart ring structures, and a thin tension web. The ring structures are both affixed to and rotate with one of the rotatable members, the ring structures each having at least one substantially axial surface which may contact substantially axial surfaces of the other rotatable member. The web has high tensile strength, a high surface area to volume ratio, a thermally efficient flow arrangement to the surrounding medium, and high thermal conductivity. The web is secured to each of the two ring structures and substantially spans the space between the substantially axial surfaces of the ring structures. The web has a significantly higher thermal coefficient of expansion than the material between the substantially axial surfaces of the other rotatable member such that the web is in tension at temperatures of the surrounding medium below the predetermined temperature thereby causing the substantially axial surfaces of the ring structures to engage the substantially axial surfaces of the other rotatable member for coupling the two rotatable members for rotating together. The web is not in tension at temperatures of the surrounding medium at or above the predetermined temperature thereby causing the substantially axial surfaces of the ring structures to disengage from the substantially axial surfaces of the other rotating structure for de-coupling the two rotatable members so they do not rotate together.

BRIEF DESCRIPTION OF THE SEVERAL VIEWS OF THE DRAWINGS

The foregoing summary, as well as the following detailed analyses of the physical principles and detailed description of preferred embodiments of the present invention will be better understood when read in conjunction with the appended drawings. For the purpose of illustrating the invention, particular arrangements and methodologies are shown in the drawings. It should be understood, however, that the invention is not limited to the precise arrangements shown, or the methodologies of the detailed description. In the drawings.

DETAILED DESCRIPTION OF THE INVENTION

The above discussed controlled descent device, in which the present invention is to play a role, contains three non-rotating shafts affixed to a backplate—the rotating elements rotating on the shafts on bearings. The upper shaft contains a cable spool, which drives a large gear through a torque-limiting clutch. The middle shaft contains a smaller gear meshing with the large gear causing the middle shaft to rotate four times faster. A second gear on the middle shaft meshes with a much smaller gear on the lower shaft, so it rotates another five times faster. Thus the descent-slowing mechanism is driven twenty times faster than the cable spool at one-twentieth of the torque. A high-speed, low-torque, rapid-reacting thermal clutch in accordance with a preferred embodiment of the present invention is positioned between the rotating lower shaft and a descent-slowing mechanism to automatically de-couple and re-couple the rotating lower shaft and the descent-slowing mechanism with temperature changes.

Figure 1:
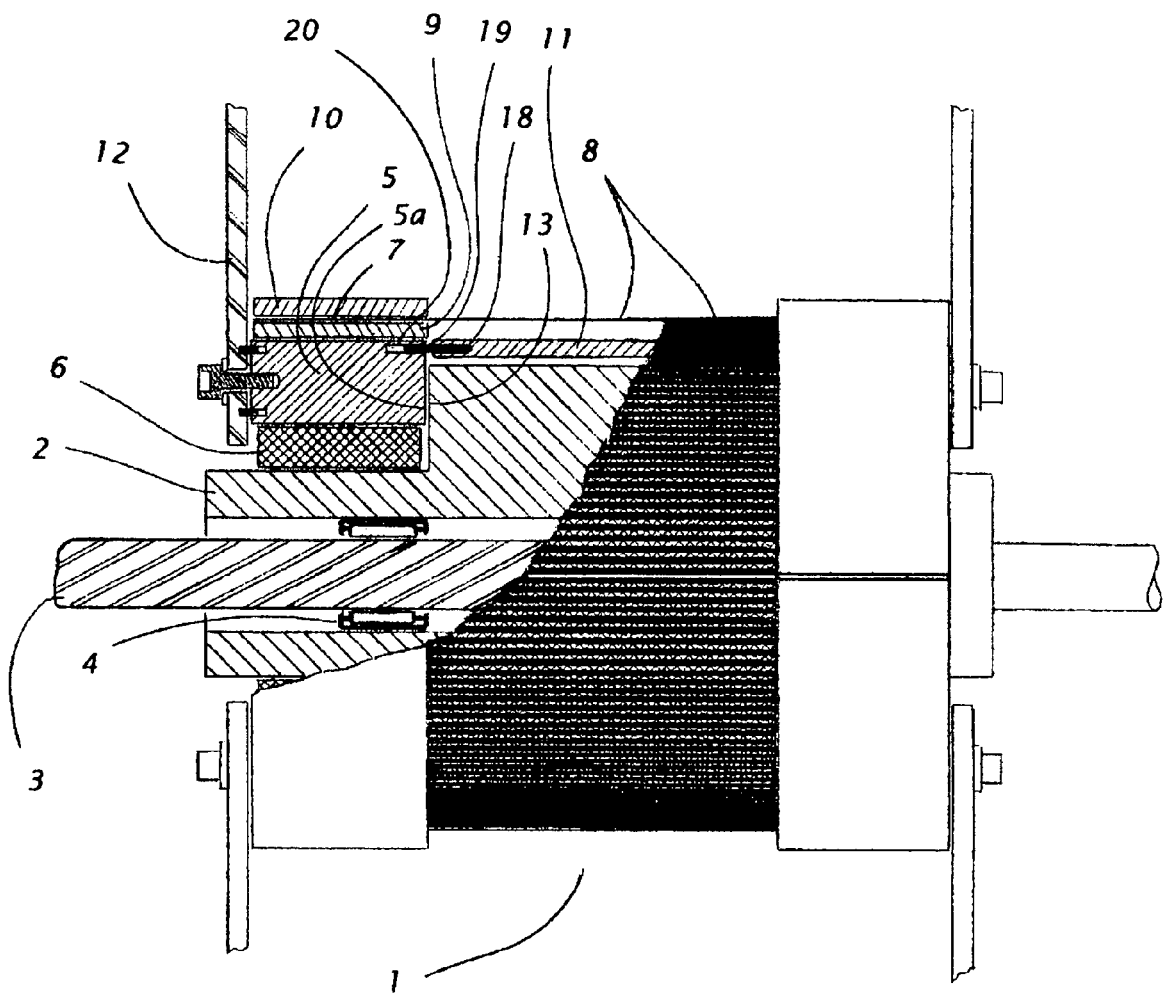
FIG. 1 is an elevation view, partially broken away, of a fast-acting thermal clutch assembly in accordance with a preferred embodiment of the present invention.

FIG. 1 shows a fast-reacting thermal clutch assembly 1 in accordance with a preferred embodiment of the present invention. The thermal clutch 1 functions to rapidly de-couple one rotatable member from another rotatable member when the temperature of the surrounding medium (hereinafter the ambient temperature) to which the clutch assembly 1 is exposed goes to or above a predetermined temperature and to rapidly re-couple the rotatable members when the ambient temperature goes below the predetermined temperature. In the present embodiment the predetermined temperature has been selected to be 200° F. However the present invention is operable at different predetermined temperatures for particular applications.

A radially inner rotatable member, in the present embodiment a hollow high-speed input shaft 2 fabricated of free-machining Invar 36 is supported on the non-rotating lower shaft 3 of the decent control device by a set of bearings, in this embodiment two caged drawn-cup high-speed needle bearings 4 (only one shown). The hollow shaft 2—firmly connected at its axial inboard end to a small gear of the descent control device that drives it (not shown)—has a pair of substantially axial surfaces, in the present embodiment two flat outward-facing annular anvil surfaces 13, (2.5 inch O.D.) on each end which, in the present embodiment, are about two inches apart. Outboard or axially outwardly of the anvil surfaces 13, are a pair of axially spaced apart ring structures, in the present embodiment, two compression-rings 5 whose inboard or substantially axially inwardly facing surfaces or ends 5a engage and exert a compressive force on the flat anvil surfaces 13 of the input shaft 2, to maintain coupling between the two compression rings 5 and the input shaft 2 as long as the friction torque between the two compression rings 5 and the flat anvil surfaces 13 exceeds the driving torque of the hollow high-speed input shaft 2. Two bushings, in the present embodiment Graphalloy® bushings 6 support the de-coupled compression rings 5 on input shaft 2 during any brief de-couplings. Radial arms of a radially outer rotational member 12, are affixed or rigidly attached to the outboard or outer axial ends of the compression rings 5 and rotate with the compression rings 5 to drive the descent-slowing mechanism (not shown) when the web 8 tension is sufficiently high to couple the compression rings 5 to the input shaft 2.

A bonded web assembly 7, comprised of a high thermal expansion material tension web 8, with an inner web ring 9 and a split outer web ring 10 at each end, is bonded at high temperature to each of the compression rings 5 to span the space between the compression rings 5 and between the anvil surfaces 13 and to provide the compressive force between the compression rings 5 and the annular anvil surfaces 13 of the low thermal expansion hollow input shaft 2 at ambient temperatures which are below the predetermined temperature. The tension web 8 has a significantly higher thermal coefficient of expansion than the material between the anvil surfaces 13 of the input shaft 2 such that the tension web 8 is in tension at ambient temperatures below the predetermined temperature thereby causing the substantially axial surfaces 5a of the compression rings 5 to engage the anvil surfaces 13 of the input shaft 2 for coupling the two rotatable members (input shaft 2 and outer rotational member 12) for rotating together, and is not in tension at ambient temperatures at or above the predetermined temperature thereby causing the substantially axial surfaces 5a of the compression rings 5 to disengage from the anvil surfaces 13, de-coupling the two rotatable members so they do not rotate together.

A floating annular torque-collar 11 is preferably provided to eliminate any twisting motion between the two compression rings 5 without exerting any axial force beyond what is provided by the tension in the tension web 8. At each end of the collar 11, a plurality of evenly circumferentially spaced holes 18, in the present embodiment sixteen such holes, are provides. Preferably the holes 18 are drilled approximately 0.0400 inches in diameter×0.25 inches deep into each end of the collar 11. A corresponding plurality (sixteen) of 0.0410 inch diameter×0.375 long stainless steel rods 19 are installed, preferably by pressing, into the holes 18. The rods 19 also fit into sixteen aligned mating clearance holes 20, each 0.0430 inch diameter×0.25 inch deep, drilled into each compression ring 5. The clearance holes 20 and the approximately 20 mil axial clearance between each collar 11 and the corresponding 2.000 inch anvil spacing insures that the collar 11 does not contribute any axial forces while preventing one compression ring 5 from twisting relative to the other compression ring 5 by no more than 4 mils (<0.2 degrees) at the 2.657 inch diametral location of the rods 19.

Figure 2:
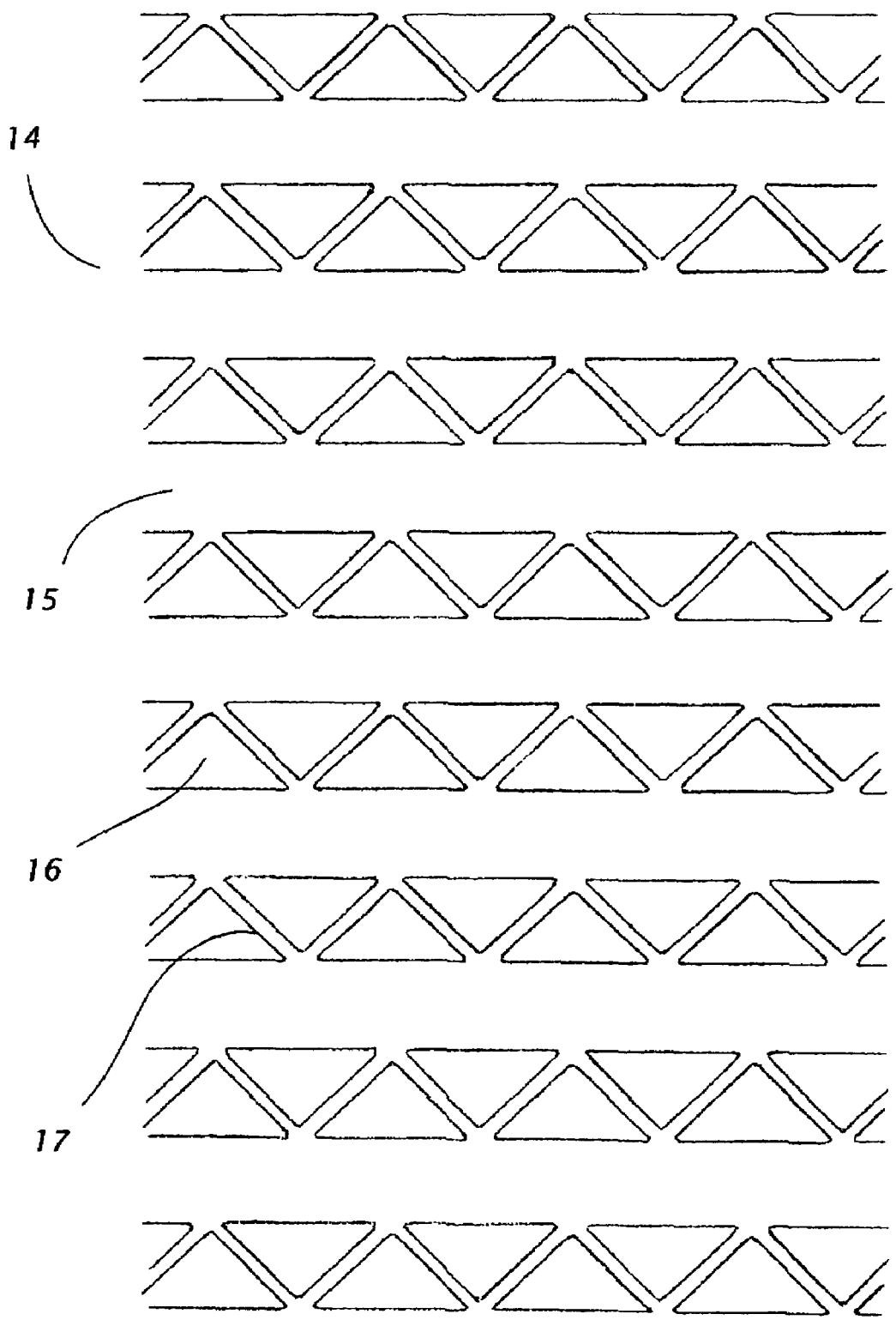
FIG. 2 is a greatly enlarged view of the perforation pattern that exists throughout the middle portion of the tensioning web of FIG. 1.

The tension web 8, which has high tensile strength, a high surface area to volume ratio, a thermally efficient flow arrangement to the surrounding medium, and high thermal conductivity, is preferably fabricated of 3 mil, hardened, high-strength beryllium copper (BeCu). Other materials having the same or similar characteristics may alternatively be used. The materials which are preferably used for the compression rings 5, the inner web ring 9 and the outer web ring 10, do not impact the predetermined temperature or trigger temperature, and so they can be made of matching thermal expansion materials to the BeCu (like 300 series stainless steel), so as not to unduly stress the epoxy bonds. Again, other materials compatible with the material of the tension web 8 may be employed for particular applications. Photo-chemical etching, or photo-etching for short, is the most economical way to fabricate the preferred intricate perforation pattern 14 of the preferred tension web 8 with high precision. FIG. 2 shows an enlarged view of 0.268 inches×0.480 inches of a preferred intricate perforation pattern 14 in the middle of the 4.00 inch by 9.41 inch rectangular photo-etched BeCu tension web 8. Other perforation patterns or no perforation pattern may alternatively be employed. The perforation pattern 14 extends through the middle 2 inches of the 4.00 inch space for the entire 9.41 inch length. The resulting one-hundred forty-seven (147), 2 inch-long, 0.032 inch wide horizontal lands 15 serve as the tensioning bands for the clutch assembly 1. The resulting (146) in-between spaces 16 are also 0.032 inches wide, with alternating 0.006 inch wide members 17 angled at 45° from the horizontal as shown. The angled members 17 are sized to provide structural stability, yet still allow for the necessary airflow over the tensioning bands 15 so that the tensioning web 8 functions as described above.

A thermal analysis (not included) demonstrates that with all of the previously indicated materials and dimensions, the thermal time constant of the tension web 8, when rotating at 1,000 RPM in 200° F. air, is slightly less than one half-second.

When the clutch assembly 1 is assembled as indicated below, a mechanical analysis demonstrates that all of the stresses and forces are well within what is required for the above identified controlled-descent device application with substantial safety factors. During normal operation, at normal ambient temperatures, the tensioning web 8 pulls axially inwardly on both of the compression-rings 5 with enough force to insure that the compression rings 5 engage the annular anvil surfaces 13 of the input shaft 2 without slipping, and so will transmit all the required torque between the input shaft 2 and the radial arm 12 of the descent-slowing mechanism. In no case (as a consequence of the action of the torque-limiter on the upper shaft (not shown)), will that required torque be greater than 105 in-lbs.

The tension web 8 develops the necessary pull force on the compression rings 5 in the following way: The tension web 8 is first bonded (epoxied) to the inner and outer web rings, 9 and 10 at each end. The curing temperature of the initial bonding procedure is not critical. The outer rings 10 are undersized and gapped to provide a clamping force during the bonding process. Then the bonded web assembly 7 is slid over the input shaft 2 and the collar 11 and the compression-rings 5 are then bonded to the inside circumferential surfaces of each of the inner rings 9 at 215° F. in a fixture that holds the compression rings 5 tight against the anvil surfaces 13 of the input shaft 2. Note: Aremco 631 is the recommended epoxy, although other epoxies or bonding agents may be used. It can cure at 200° F. in 2 hours, and it exhibits a tensile shear strength of 3,000 psi. The usable temperature range:−85° F. to 400° F. Upon returning to room temperature after the bonding process, the 2 inch free length of the tension web 8 wants to contract far more than does the input shaft 2, thus putting the tension web 8 in tension which in-turn causes the compression rings 5 to exert the compressive force on the anvil surfaces 13.

Mechanical Analysis

The amount of compressive force exerted by the tension web 8 is independent of the free length of the tension web 8. It depends only on the coefficients of expansion of the tension web 8 and the Invar input shaft 2, on the difference in temperature from 215° F. (the temperature at which the web assembly 7 is bonded to the compression rings 5), and on the cross-sectional area of the 147 web lands 15. The calculation is as follows:

The coefficient of expansion of the BeCu web 8, $\alpha_B = 9.8 \times 10^{-6}$ inches/inch/° F.

The coefficient of expansion of the Invar shaft, $\alpha_I = 0.8 \times 10^{-6}$ inches/inch/° F.

Thus $\Delta\alpha = 9.0 \times 10^{-6}$ in/in/° F., and at 70° F., the difference in temperature is 145° F.

So from $\epsilon = (\Delta\alpha)(\Delta T)$, the tensile strain $\epsilon$ in the tension web 8 is $1,305 \times 10^{-6}$ in/in.

Next from a $\sigma = \epsilon E$, and from the modulus of elasticity of BeCu, $E_B = 19 \times 10^6$ psi, the tensile stress $\sigma$ in the tension web 8 is 24,795 psi. Note: BeCu alloy 190, mill-hardened to temper XHMS has a minimum yield strength of 150,000 psi—a 6× safety factor. Even at−75° F., (where the tensile stress goes up to 49,590 psi), there is a safety factor of 3×. The cross-sectional area A of the 147 web lands 15 is $(147)(0.032)(0.003) = 0.014112$ in2 so from $P = \sigma A$, the tensile web force $P = (24,795)(0.014112) = 350$ lbs. Thus at room temperature (about 70° F.), each compression ring 5 exerts 350 pounds on its mating anvil surface 13.

The amount of torque T that the compression force enables at each compression ring 5 without slipping is equal to $r \mu P$, where r is the 1.125 inch radius, and $\mu$ is the static coefficient of friction between the compression ring 5 and the anvil surface 13, assumed here to be 0.3 (if both parts are electroless-nickel plated for good lubricity and high wear resistance). Thus, torque $T = (1.125)(0.3)(350) = 118$ in-lbs. And the total torque 2T that the thermal clutch 1 is able to support at 70° F. is 236 in-lbs—greater than 2× the maximum 105 in-lbs (the torque-limiter on the upper shaft slips to keep the torque from going higher). Even at a sustained temperature of 140° F., the thermal clutch 1 could still support 122 in-lbs. Note that with the large 1 inch×9.41 inch bond areas on each side (9.41 in2), the shear stress is only 37 psi at 70° F., and 74 psi at−85° F. Thus the 3,000 psi shear strength of the Aremco 631 epoxy provides a huge safety factor against potential creep over time.

With the thermal time constant established and the mechanical parameters validated, it is now possible to determine step-by-step how the fast-reacting thermal clutch 1 functions in its intended application, i.e. for the sudden ambient temperature changes that can occur when a descending person passes first into, and then out of, a hot zone caused by a fire-floor. (Note: The probability of a hot zone at a fire-floor is significantly less likely on the windward side of the building than on a non-windward side—but an escaping person isn't always afforded the luxury to choose which side of the building he goes out of.)

Consider the following scenario: A 160 lb man descends from the 40th floor of an office high-rise utilizing the above identified controlled descent device. He slowly approaches the 30th floor, where smoke is billowing out of an open window. His descent speed is 1.3 ft/sec. The temperature of the hot smoke coming out of the eight foot high window is 350° F. A foot out from the window (where the man is) the temperature is 250° F. Below the window the temperature returns to the ambient 70° F. outside temperature. The controlled descent device weighs about 40 lbs and is worn as a backpack, with a cable coming out the top and the thermal clutch 1 located approximately at waist level. The torque being supported at the time by the thermal clutch 1 is 28 in-lbs. The torque that the thermal clutch 1 is able to support at the 70° F. temperature is 236 in-lbs. As the thermal clutch 1 descends into the hot zone of the window, the torque 2T that the thermal clutch 1 is able to support rapidly decreases.

After half a second (For simplicity, exactly half a second will henceforth be taken as the time constant), the temperature of the tension web 8 of the thermal clutch 1 (spinning at 1,000 RPM) reaches 184° F. (63.2% of the difference between 250° F. and 70° F., added to 70° F.), where the torque that the clutch 1 can support at the 184° F. temperature is calculated as follows:

$2T = (2)[(9.0 \times 10^{-6})(215-70) - (9.8 \times 10^{-6})(184-70)](19 \times 10^6)(0.014112)(1.125)(0.3) = 34$ in-lbs. (Notice that the calculation takes into account the fact that only the tension web 8—not the Invar shaft 2—participates during the rapid relieving of its tensile stress.) After another 0.04 seconds (0.54 seconds total, and a total descent of about 8 inches), the temperature of the tension web 8 reaches 188° F. where the torque 2T=27 in-lbs, and the clutch 1 begins to slip. Then after another 0.14 seconds (0.68 seconds total, and a total descent of about a foot), the temperature of the tension web 8 reaches 203° F. where the torque goes to zero, and the man begins to "free-fall" at 1 G, having already attained a velocity of 3.5 ft/sec.

The man free-falls through the next seven feet (past the bottom of the window). That free fall takes only 0.56 seconds, and at the end, the man is falling at the rate of 21.5 ft/sec. During that 0.56 seconds the temperature of the tension web 8 further increases to 234° F., with the air velocity to the tension web 8 now being supplied mainly by the velocity of the descent and less so by the now-slowed rotation of the tension web 8.

Now re-immersed in the 70° F. ambient temperature, it takes only 0.09 seconds for the temperature of the tension web 8 to return to 203° F. where the re-coupling process of the thermal clutch 1 begins. During that 0.09 seconds, the man descends another 2.1 feet (taking him completely out of the hot zone), while his velocity further increases to 24.4 ft/sec. Over the next 0.04 seconds the temperature of the tension web 8 reduces to 192° F. where the torque 2T goes back up to 28 in-lbs. During that time, the man descends another foot while his velocity goes to 25 ft/sec. There is no acceleration or deceleration at that point, for the descent-slowing mechanism is being driven at the same speed it was initially (at 1,000 RPM). However, the input shaft 2 is rotating at about 19,000 RPM and the thermal clutch 1 is still slipping. Over the next 0.24 seconds the web temperature reduces to 144° F., taking 2T up to 105 in-lbs and the torque on the upper shaft up to 2,100 in-lbs which causes the torque-limiter on the upper shaft to slip. During that time, the deceleration increases from 0 G's to 2.5 G's, taking the descent speed from 25 ft/sec down to 21.1 ft/sec in 5.5 feet, while the web assembly 7 and the descent-slowing mechanism are sped up to about 1,900 RPM. As the torque-limiter slips, the Invar input shaft 2 is quickly reduced in speed to 1,900 RPM to match the speed of the web assembly 7, and the thermal clutch 1 no longer slips. The torque-limiter then maintains that 2.5 G deceleration rate (for the combined weight of the 160 lb person and his 40 lb backpack) until the descent speed gets down to 2.5 ft/sec, which occurs in 0.23 seconds and 2.7 feet. Now the speed of the cable spool on the upper shaft is down to 95 RPM (matching the speed of the upper-shaft gear) and the torque-limiter no longer slips. The descent-slowing mechanism then takes the descent speed back to the initial 1.3 ft/sec in 0.03 seconds and 0.1 feet while the cable force reduces from 700 lbs to 200 lbs (and the deceleration reduces from 2.5 G's back to 0 G's). Thus, the slow descent rate is reestablished a mere ten feet past the hot zone.

Recapping the series of events: After about one foot and one second of exposure to the hot zone, the thermal clutch 1 fully de-couples and the man is accelerated at 1 G through the entire hot zone in less than a second. Once through, the hot zone re-coupling begins with the thermal clutch still slipping as the torque increases to 105 in-lbs, where the torque-limiter on the upper shaft slips and the person decelerates at the maximum rate. With the torque-limiter slipping, the high-speed shaft slows to 1,900 RPM and the thermal clutch 1 fully re-couples as the person continues to decelerate. At 2.5 ft/sec, the torque-limiter stops slipping and the normal descent rate is quickly reestablished. Most remarkably this sequence of events occurs automatically—not through the use of sophisticated sensors or computer-driven actuators—but with a simple, passive, mechanical thermal clutch 1 and (upper-shaft) torque-limiter—and it will occur over and over (if need be) at other hot zones. Similar successful results can be demonstrated for a 60 lb person and a 360 lb person (each with a 40 lb backpack)—the difference being how far beyond the hot zone the normal slow descent rate is reestablished. (5 feet and 18 feet, respectively.)

As described above, it is apparent that the 203° F. trigger temperature (where the web tensile force—and therefore, the clutch clamping force—goes to zero) differs from the 215° F. temperature at which the bonding took place between the compression rings 5 and the inner and outer rings 9, 10 of the previously bonded web assembly 7. That is because in the very brief time it takes for the web temperature to change over a hundred degrees, the temperature of the enormously more massive high-speed Invar input-shaft 2 changes hardly at all. That effectively negates even the small $0.8\times10^{-6}$ inches/inch/° F. coefficient of thermal expansion of the Invar input shaft 2 in rapid transient situations.

The above conclusion raises the question of whether the input shaft 2 needs to be made of Invar. For example, one could envision a web-tensioning force of 350 lbs being applied to the web assembly 7 by a special fixture during the bonding to the compression rings 5, while a 300 series stainless steel input shaft replaces the Invar 36 input shaft 5. The coefficient of thermal expansion of the 300 series stainless steel closely matches that of BeCu so the 350 pound tension would be maintained at room temperature and any other sustained temperature for that matter. Only during very rapid temperature changes (as for example when passing the intense heat of a fire floor) would the web temperature change and the input shaft temperature not change, so that the thermal clutch 1 would de-couple and re-couple as intended. Thus, this arrangement could be considered as an alternate embodiment—but not the preferred embodiment, because the new trigger temperature would be merely a specific temperature difference above the initial sustained ambient, not a specific actual temperature as is the case for the preferred embodiment.

Although the preferred embodiment of the fast-response thermal clutch has been described or specified in significant detail in the present application, and one alternate embodiment has been described above, it is important to realize that other alternate arrangements still within the scope of the present invention are feasible. Also, it will be appreciated by those skilled in the art that alternate uses can be found that differ from the proposed use, and that changes or modifications could be made to the above-described embodiments without departing from the broad inventive concepts of the invention. Therefore it should be appreciated that the present invention is not limited to the particular use or particular embodiments disclosed but is intended to cover all uses and all embodiments within the scope or spirit of the described invention as defined by the appended claims.

I claim:

1. A thermal clutch assembly for rapidly de-coupling one rotatable member from another rotatable member when the temperature of the surrounding medium goes to or above a predetermined temperature and for rapidly re-coupling the two rotatable members when the temperature of the surrounding medium returns to below the predetermined temperature, the assembly comprising:
   a radially inner rotatable member;
   a radially outer rotatable member;
   a pair of axially spaced apart ring structures which are both affixed to and rotate with one of the rotatable members, the ring structures each having at least one substantially axial surface which may contact substantially axial surfaces of the other rotatable member; and
   a thin tension web which has high tensile strength, a high surface area to volume ratio, a thermally efficient flow arrangement to the surrounding medium, and high thermal conductivity, and which is secured to each of the two ring structures and substantially spans the space between the substantially axial surfaces of the ring structures, the web having a significantly higher thermal coefficient of expansion than the material between the substantially axial surfaces of the other rotatable member such that the web is in tension at temperatures of the surrounding medium below the predetermined temperature thereby causing the substantially axial surfaces of the ring structures to engage the substantially axial surfaces of the other rotatable member for coupling the two rotatable members for rotating together, and is not in tension at temperatures of the surrounding medium at or above the predetermined temperature thereby causing the substantially axial surfaces of the ring structures to disengage from the substantially axial surfaces of the other rotating structure for de-coupling the two rotatable members so they do not rotate together.

2. The assembly as recited in claim 1 wherein the thermal time constant of the thin tension web is made very small as a result of a large relative velocity between the thin tension web and the surrounding medium, brought about by at least one of: high rotational speed of the one rotatable member, and high relative velocity of the assembly with respect to the surrounding medium.

3. The assembly as recited in claim 1 further including an annular collar that precludes relative angular motion, but not relative axial motion, between the ring structures.

4. The assembly as recited in claim 1 wherein the web includes a perforation pattern that enhances the thermal efficiency of the flow arrangement to the surrounding medium.

5. A thermal clutch assembly for rapidly de-coupling one rotatable member from another rotatable member when the temperature of the surrounding medium rapidly increases by a predetermined temperature difference and for rapidly re-coupling the two rotatable members when the temperature of the surrounding medium rapidly decreases by a predetermined temperature difference, the assembly comprising:
- a radially inner rotatable member;
- a radially outer rotatable member;
- a pair of axially spaced apart ring structures which are both affixed to and rotate with one of the rotatable members, the ring structures each having at least one substantially axial surface which may contact substantially axial surfaces of the other rotatable member; and
- a thin tension web which has high tensile strength, a high surface area to volume ratio, a thermally efficient flow arrangement to the surrounding medium, and high thermal conductivity, and which is secured to each of the two ring structures and substantially spans the space between the substantially axial surfaces of the ring structures, the web having a relatively equivalent thermal coefficient of expansion to the material between the substantially axial surfaces of the other rotatable member such that the tension web remains in tension when the two are in thermal equilibrium thereby causing the substantially axial surfaces of the ring structures to engage the substantially axial surfaces of the other rotatable member for coupling the two rotatable members for rotating together, and such that the web comes out of tension thereby causing the substantially axial surfaces of the ring structures to disengage from the substantially axial surfaces of the other rotatable member for de-coupling the two rotatable members when the temperature of the surrounding medium rapidly increases by a predetermined amount, and the web again goes into tension thereby re-coupling the two rotatable members when the temperature of the surrounding medium rapidly decreases by a predetermined amount.

6. The assembly as recited in claim 5 wherein the thermal time constant of the thin tension web is made very small as a result of a large relative velocity between the thin tension web and the surrounding medium, brought about by at least one of: high rotational speed of the one rotatable member, and high relative velocity of the assembly with respect to the surrounding medium.

7. The assembly as recited in claim 5 further including an annular collar that precludes relative angular motion, but not relative axial motion, between the ring structures.

8. The assembly as recited in claim 5 wherein the web includes a perforation pattern that enhances the thermal efficiency of the flow arrangement to the surrounding medium.

* * * * *